(No Model.)

W. A. MARTIN.
WHEEL FOR DRAWING WATER FROM WELLS.

No. 274,011. Patented Mar. 13, 1883.

Witnesses.
W. A. Watts
G. H. Gayley

Inventor.
W. A. Martin

UNITED STATES PATENT OFFICE.

WILLIAM A. MARTIN, OF LAURENS COURT-HOUSE, SOUTH CAROLINA.

WHEEL FOR DRAWING WATER FROM WELLS.

SPECIFICATION forming part of Letters Patent No. 274,011, dated March 13, 1883.

Application filed September 2, 1882. (No model.)

*To all whom it may concern:*

Be it known that I, WILLIAM A. MARTIN, a citizen of the United States, residing at Laurens Court-House, in the county of Laurens and State of South Carolina, have invented a new and useful Wheel or Pulley for Hoisting Water from Wells or Cisterns, of which the following is a specification, reference being had to the accompanying drawings, forming part thereof.

Figure 1:
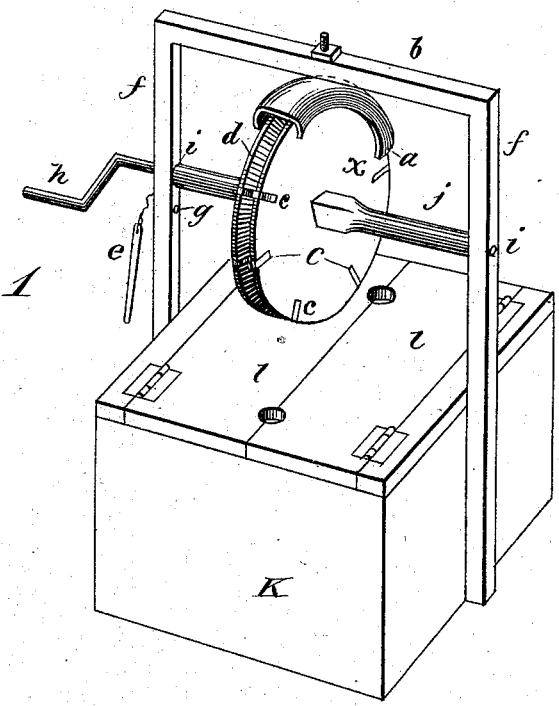
Figure 2:
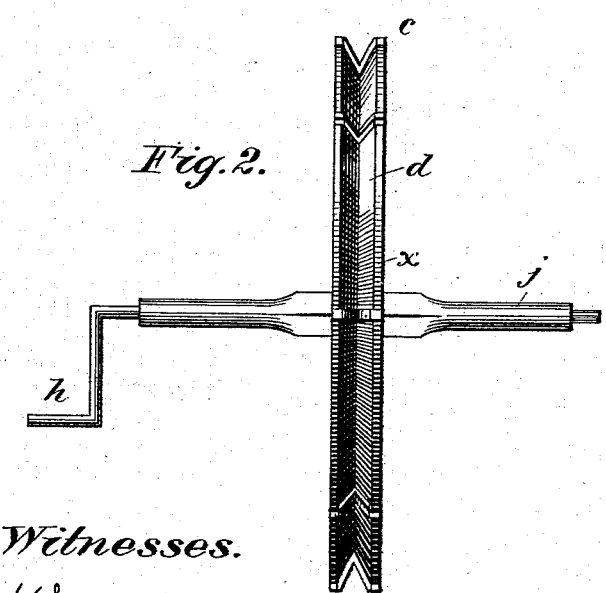
Figure 3:
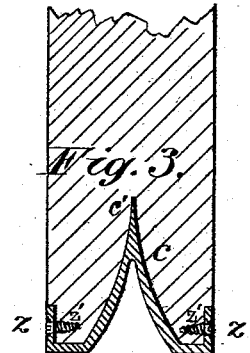

Figure 1 is a perspective view of the invention applied to a well. Fig. 2 is an edge view of the wheel. Fig. 3 is a view of one of the chain-stays, shown in section within a part of the pulley.

This invention relates to the employment of a wooden grooved pulley having a series of chain-stays made to fit the groove in the pulley, all of which will be hereinafter more particularly described.

$x$ represents a pulley which is to be made of wood for the sake of economy, having a groove, $d$, on its periphery of an angular or V form. I usually construct such a wheel of about twelve inches in diameter; but any other size may be used. The groove should be about one inch and a quarter in depth. The pulley for this diameter should be two inches thick. A shaft, $j$, passes through the pulley $x$, and is supported in the standards $ff$, which are firmly supported in the frame or well-box K. These standards $ff$ support the thwart or gallows beam $b$, and the chain-guard $a$ is supported on this beam $b$ by means of a screw-bolt and nut, or in any other convenient manner. The function of the guard $a$ is to keep the chain in the groove $d$. In the standard is a hole, $g$, and a pin, $e$, is used to put in the hole $g$ to stop the buckets at any point the operator may desire.

$cc$ are chain-stays, made of metal, and constructed as follows: The point $c'$ is made to fit into the triangular groove $d$ in the pulley $x$. The outer ends, $zz$, of the stay are turned over, as shown in Fig. 3, and secured by screws $z'z'$. The interior $y$ is made conformable to the angular groove $d$. There are eight of these stays used in a wheel of twelve inches diameter. I cut notches in the outer edges of the rim and countersink on the outside of the pulley, and the size of the stay is just sufficient to fill these notches and the countersunk spaces on each side, so that the ends $zz$ will be flush with the surface of the pulley and the stays will not impinge upon the guard $a$ as the wheel revolves within it.

The chain used in this apparatus has on it two buckets—one on each side of the pulley $x$—so that when one bucket is up the other is down in the water.

I claim—

1. The wooden pulley having an angular groove in its periphery and supplied with a series of chain-stays inserted within the groove and countersunk in the pulley, substantially as and for the purpose described.

2. The combination of the pulley having chain-stays and the guard attached to the cross-beam, substantially as and for the purpose described.

WM. A. MARTIN.

Witnesses:
W. A. WATTS,
S. K. TAYLOR.